United States Patent
Gabbrielli et al.

[11] 3,964,594
[45] June 22, 1976

[54] KEYBOARD OF ELASTIC MATERIAL FOR OFFICE MACHINES

[75] Inventors: Luigi Gabbrielli; Piero Giovanetti, both of Ivrea (Turin), Italy

[73] Assignee: Ing. C. Olivetti & C., S.p.A., Ivrea (Turin), Italy

[22] Filed: Nov. 16, 1973

[21] Appl. No.: 416,599

[30] Foreign Application Priority Data
Dec. 1, 1972  Italy .................................. 70784/72

[52] U.S. Cl. ............................ 197/98; 235/145 A; 340/365 R
[51] Int. Cl.² ......................... B41J 5/08; B41J 5/12
[58] Field of Search ............. 197/98, 102, 103, 104; 235/145 R, 145 A, 146; 200/5 R, 5 A; 178/17 C; 340/365

[56] References Cited
UNITED STATES PATENTS

| | | | |
|---|---|---|---|
| 2,947,404 | 8/1960 | Siebels et al. | 197/102 |
| 3,120,583 | 2/1964 | Cornell | 197/98 UX |
| 3,684,842 | 8/1972 | Boulanger | 200/5 R |
| 3,699,294 | 10/1972 | Sudduth | 340/365 UX |
| 3,760,137 | 9/1973 | Shimojo et al. | 340/365 R X |
| 3,823,309 | 7/1974 | Caruso | 197/98 X |

*Primary Examiner*—Edgar S. Burr
*Assistant Examiner*—R. E. Suter
*Attorney, Agent, or Firm*—Schuyler, Birch, Swindler, McKie & Beckett

[57] ABSTRACT

In an office machine keyboard comprising a plurality of keys formed by an array of areas of layer of elastic material, each key is provided with an identifying character in relief on an insert. The insert is embedded in the elastic layer so that the character is visible on the fingering surface of the layer, is surrounded by the material of the elastic layer and contrasts in color with the material. The insert is provided with internal passages. The elastic material engaging the internal passages forms struts interlocking the inserts in the elastic layer.

The keyboard is formed by injection of a hot elastomer in a moulding die in which are positioned the inserts.

5 Claims, 8 Drawing Figures

KEYBOARD OF ELASTIC MATERIAL FOR OFFICE MACHINES

BACKGROUND OF THE INVENTION

1. Field of the invention

The present invention relates to an office machine keyboard comprising a layer of elastic material formed with an array of individually depressable areas constituting the keys of the keyboard.

2. Description of the prior art

The keyboards formed by elastic material solve the problems concerned, for example, the infiltration of foreign bodies into the interior of the keyboard itself, the insulation of the fingering area from any possible internal electrical apparatus and the partial absorption of the noise typical of office machines.

The layer of elastic material is generally mounted on a rigid supporting surface provided with holes permitting the passage of rigid shanks connecting each key with the encoding device located below the supporting surface.

A very importantl problem arising in keyboards formed by a layer of elastic material is the designation of the characters. One solution to this problem provides for the formation of shaped recesses in the fingering surfaces of the layer of elastic material; by filling the recesses with another material of different colour the characters are obtained.

This solution and other similar solutions are very complex in manufacture and, moreover, good adhesion between the two materials in the course of time is not certain, so that the character tends to disappear, with poor aesthetic results.

Another known solution consists in the arrangement of inserts of disc form which have the character printed on a plane surface, between a layer of rubber and an overlying layer of transparent elastic material, the whole resting on a supporting lattice of rigid material. This solution also presents problems connected with the complexity of the process and, moreover, the character must be of a colour different from the colour of the insert so that it may be visible.

SUMMARY OF THE INVENTION

According to the present invention, there is provided an office machine keyboard comprising a plurality of keys formed by an array of areas of a layer of elastic material, each area having a fingering surface, and a plurality of inserts provided with characters in relief; the inserts are embedded in said areas of the layer of elastic material while the characters, surrounded by the material of the elastic layer, are visible on the fingering surface.

Further, according to the present invention, there is provided a method of forming visible characters in an elastic layer constituting an office machine keyboard, wherein the layer is injection moulded from a hot elastomer in a mould in which are positioned inserts provided with the characters in relief and having passages therein, the inserts being compressed in the mould between separable parts thereof in such a manner that the injected elastomer is unable to cover the relief characters but surrounds the characters and fills the passages so as to form pegs or struts which interlock with the inserts.

This solution permits the construction of homogeneous keyboards and avoids the problem of providing adhesion between several layers. The inserts are imprisoned in the body of the keyboard (i.e. the elastic layer) through mechanical interlocking means and, therefore, with greater reliability and the assurance of long life. Moreover, the inserts are located in areas connected to the body of the keyboard through surrounding zones of the layer of the elastic material, which zones are of reduced thickness, which imparts a particular resilience of movement to the keys themselves. A light pressure of the order of a few tens of grams is sufficient to actuate the keys and, therefore, the keyboard to which the present invention relates is capable of actuating any mechanical, electrical or electronic encoding system.

DESCRIPTION OF THE PREFERRED EMBODIMENT

Figure 1:
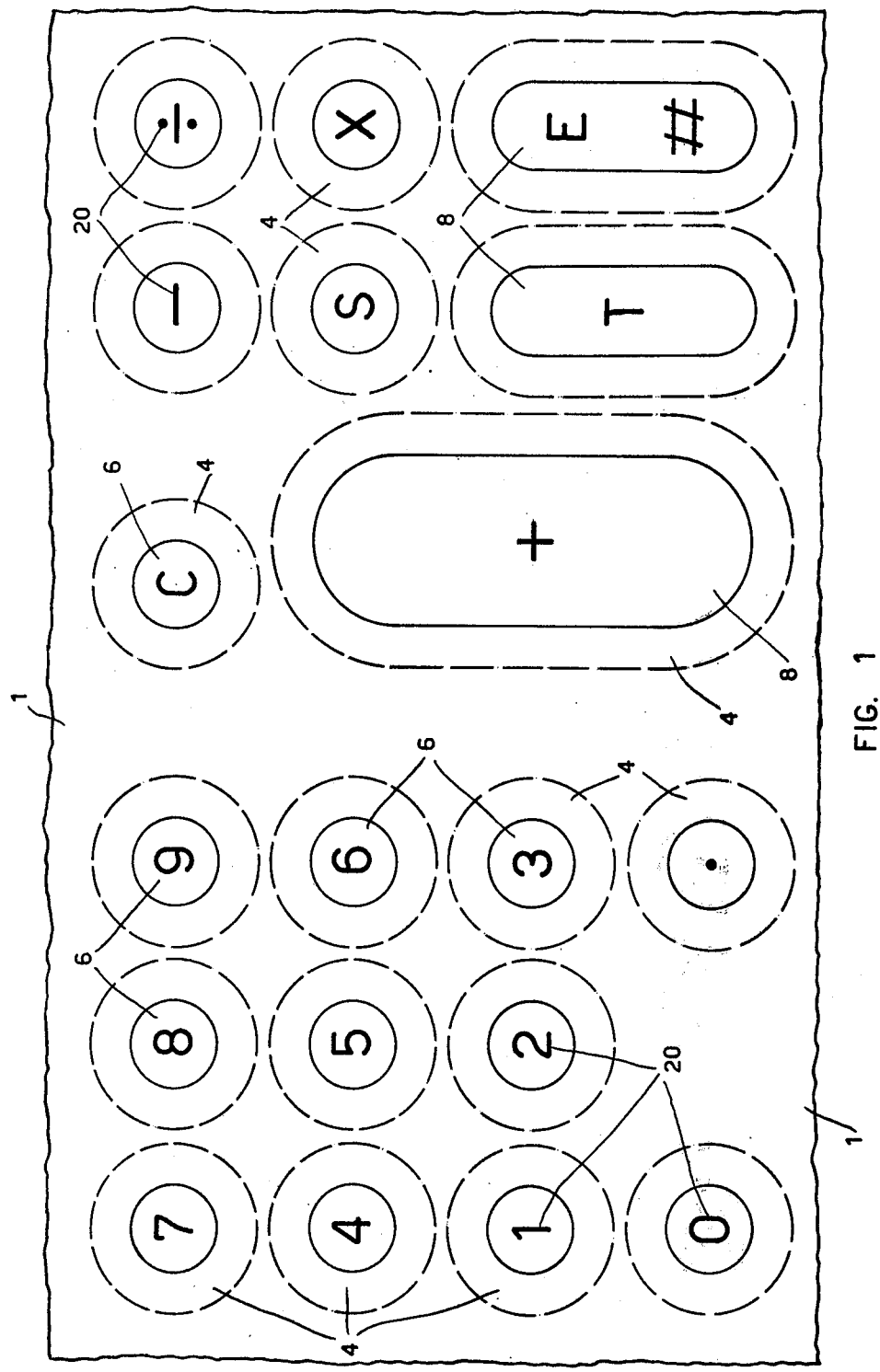
FIG. 1 is a top view of a keyboard embodying the invention.

The keyboard embodying the invention (FIG. 1) is formed by a layer 1 of elastomer-based elastic material moulded with reliefs 6 of circular cross-section or with reliefs 8 of round-ended elongated form which correspond to the keys of a normal keyboard and in which there are embedded, in the manner hereinafter described, a number of substantially cylindrical plastics inserts, each bearing in relief a character 20. The reliefs 6 and 8 containing the plastics inserts are flanked by annular zones 4 in which the layer 1 has a smaller thickness than in the other zones, as a result of which the first mentioned zones are particularly flexible and elastic.

The keyboard layer 1 is mounted on a rigid support provided with through holes under the keys and which separates the keyboard itself from an encoding mechanism. By pressing on the fingering surface, a key is deformed and its bottom surface comes into contact with a rigid shank or stem which, extending through one of the said holes, transmit the movement to the encoding mechanism.

The keyboard, however, may also be used to actuate encoding devices lying on the same rigid support, such as, for example, encoding devices of capacitive type.

Each plastics insert bearing the character in relief is secured to the body of the elastic layer in the upper part by the elastic material surrounding the character itself, at the side by the elastic material forming the relief 6 or 8, and internally through the medium of pegs of the same elastic material which extend through the insert and mechanically interlock the insert and the layer 1.

Figure 2:
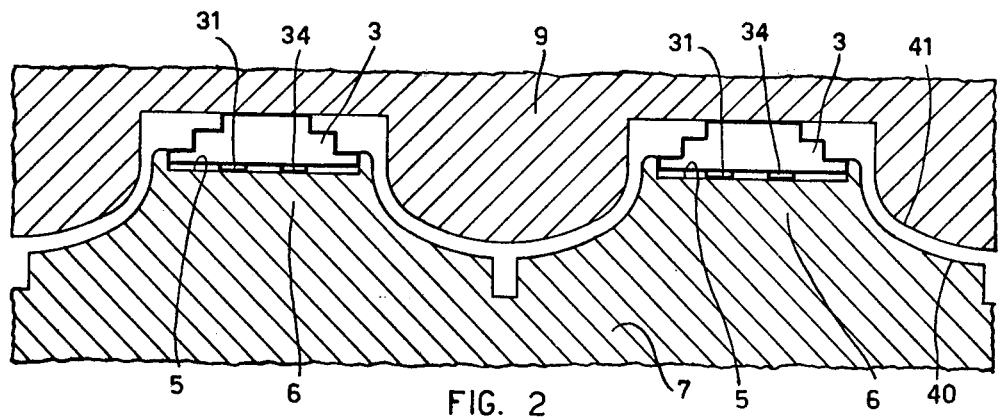
FIG. 2 shows how plastic inserts are seated in a mould for injection of the elastic material.

The keyboard is constructed by the known process of moulding by injection of hot elastomeric material. FIG. 2 shows how the inserts are positioned in the mould prior to the injection of the elastic material.

Each insert 3 is housed in a suitable seat 5 in a relief 6 of the lower mould part 7. The insert is provided with internal passages and has small projections on its bottom surface, two of these 31 and 34 being visible in FIG. 2, for resting on the plane inner surface of the seat 5. On the closing of the mould, the upper mould part 9 presses on the top surface of the character 20 of the insert 3 so that this surface may not be covered by the elastic material which is to be injected, and the projections, becoming deformed against the plane inner surface of the seat 5, absorb the said pressure without causing damage to the insert itself.

FIG. 2 moreover shows the profiles 40 and 41 of the lower and upper mould parts, which are shaped so that the thickness of the injected elastic material at the flanks of the reliefs, that is in the zones 4 of FIG. 1, is smaller than in the remainder of the layer 1.

The material injected through a duct (not shown) takes the form of the lower mould part forming the reliefs and surrounds the inserts at the top and at the side, except for the top surface of the character, which, being pressed against the upper part 9 of the mould, cannot be reached. Moreover, the material fills the internal passages of the inserts, forming, after cooling, the pegs which interlock the inserts in the layer 1.

Figure 3A:
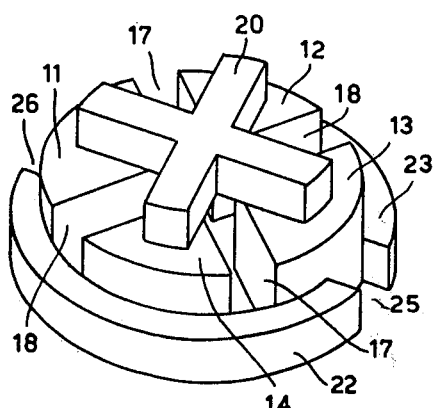
FIG. 3a is a perspective view of a character-bearing insert.
Figure 3B:
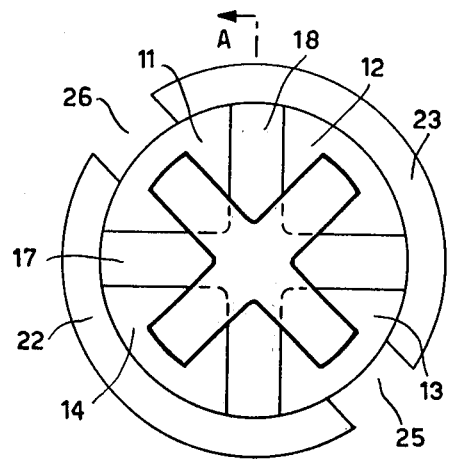
FIG. 3b is a top view of the same character-bearing insert.

FIG. 3a is a perspective view of one of these inserts, more particularly the one bearing the character X. The insert consists of a cylinder divided along two diameters by two passages 17 and 18 forming in this way four sectors 11, 12, 13, 14. These sectors are connected on the outside by two half-rings 22 and 23 of rectangular section. The half-rings 22 and 23 are separated by notches 25 and 26 which serve to orient the inserts in the mould part. This structure is common to all the inserts irrespective of the character. The character 20, for example X, is fixed on the four sectors 11, 12, 13, 14.

Figure 3C:
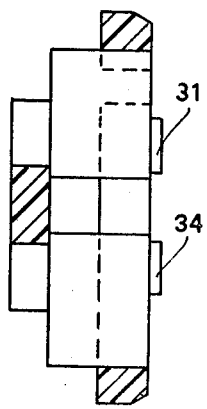
FIG. 3c is a section of the same character-bearing insert on the line A—A.
Figure 3D:
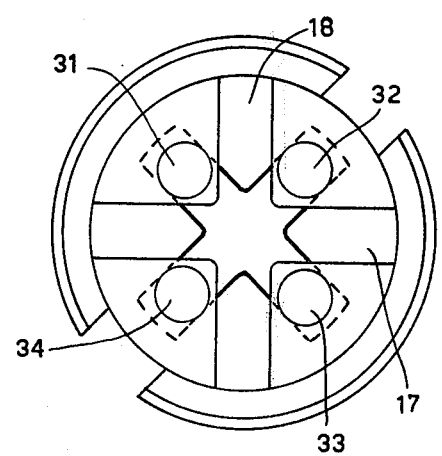
FIG. 3d is a bottom view of the same character-bearing insert.

In FIGS. 3c and 3d, there can be seen four projections 31, 32, 33, 34 of cylindrical form, the function of which has been described hereinbefore and which have one base in contact with the four sectors 11, 12, 13, 14.

These inserts are produced by known methods of moulding plastics materials and may be made either of thermosetting material or of thermoplastic material. In the latter case, they must be capable of withstanding the temperature at which the injection of the elastic material takes place.

The inserts forming the keys of a keyboard may be produced by individual moulding operations and may then be positioned individually in the mould part, or they may be produced simultaneously by a single moulding operation, being interconnected by means of a plastics network or grid.

In the latter case, the subsequent positioning in the mould part can be automatic and the network is cut and blown away. The inserts having been positioned, the mould is closed in the manner described and the stage of injection of the material begins, this being carried out by the known techniques, for example, at a moulding temperature of 170°C for a time of about two minutes.

The material used for the layer 1 may generally be an elastomer, in particular, Hypalon, ethylene-propylene, Kariflex or acrylonitrile rubber.

Figure 4A:
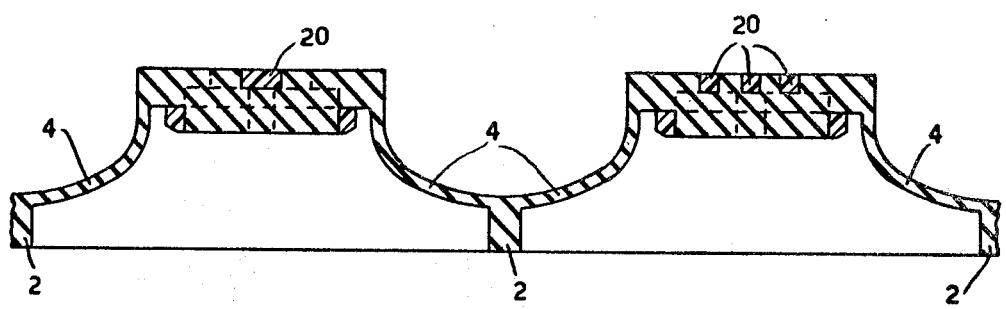
FIG. 4a is a section of a part of the keyboard comprising the keys marked with the characters X and +.
Figure 4B:
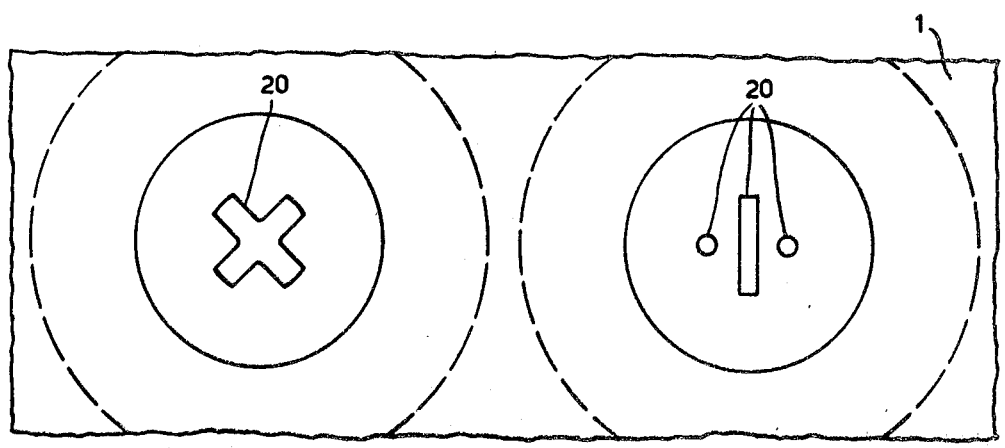
FIG. 4b is a top view of a part of the keyboard comprising the keys marked with the characters X and +.

After the injection process, the insert is completely surrounded by the elastomer as far as the top surface of the two half rings 22 and 23. On the fingering surface of the keys, the characters 20 (FIG. 4b) are visible, these being at the same level as the elastomer (FIG. 4a).

With obvious modifications in the upper part of the mould, it is possible to obtain the characters in relief or recessed with respect to the fingering surface of the keys.

The inserts remain fixed in the keys inasmuch as at the top and at the side they are surrounded by the elastomer, which obviously fills the passages 17, 18 (FIG. 3a) and forms two struts or pegs on solidifying. The struts are, therefore, elastic, pass below the character and are connected to the side and top walls of the key. By this means there is achieved the dual aim of keeping the insert firm in its seat and of keeping the elastomer adhering to the profile of the characer even during the actuation of the keys. The keys are moreover connected to the body of the cover (FIG. 4a) through the zones 4 in which the rubber has a smaller thickness than in the other zones 2, which gives the keys a considerable resilience; for example, a few tens of grams are sufficient to produce the depression thereof, while return takes place as a result of the elastic properties of the zones 4 themselves.

In this way, the keys are able to actuate any mechanical, electrical or electronic encoding mechanism. The character of the key may also be formed by a group of elementary characters; this is achieved by embedding a pluraity of independent characer-bearing inserts in the same key by the same method which has been seen. FIG. 1, for example, shows a key provided with the characters E and # which is formed by embedding two independent character-bearing inserts, one provided with the character E and the other provided with the character # .

What we claim is:
1. An office machine keyboard comprising:
    a continuous layer of elastic material,
    a plurality of key areas defined in said layer,
    a fingering surface on each one of said areas,
    a plurality of inserts, one of said inserts being located in each of said areas and being formed of a material differing in elasticity from said elastic material of said continuous layer, whereby said layer flexibly holds said inserts, said inserts being depressible to function as keys for the keyboard of said office machine,
    a relief on each one of said inserts to represent an identifying character for each of said keys,
    and at least a passage internal to each one of said inserts and extending entirely through said insert below said relief,
    each one of said inserts being embedded in the associated key defining area of said layer, said elastic material including mechanical interlocking means comprising struts filling said passages to interlock said inserts into the elastic layer.
2. A keyboard as claimed in claim 1 wherein the relief on each of said inserts is surrounded by the elastic material of said layer, and the surface of said relief is flush with said surrounding material to identify said fingering surface, whereby the corresponding chracter is visible on said fingering surface.
3. A keyboard according to claim 2, wherein each key area is surrounded by a zone of the elastic layer which is thinner than the remainder of said layer, whereby said surrounding zones are particularly flexible.

4. A keyboard according to claim 2, wherein the elastic layer and the characters have different colours.

5. A keyboard as claimed in claim 2 wherein each of said inserts comprises a plurality of sectors divided by and defining said passages, said sectors carrying said identifying character on their upper surface.

* * * * *